C. G. BAYLOR.
Vegetable Roaster.
No 101,085.
Patented March 22, 1870.
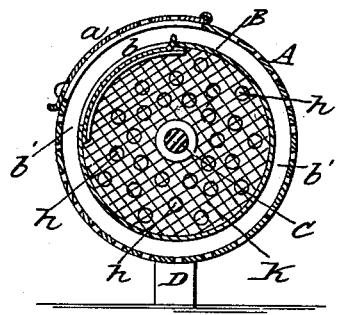
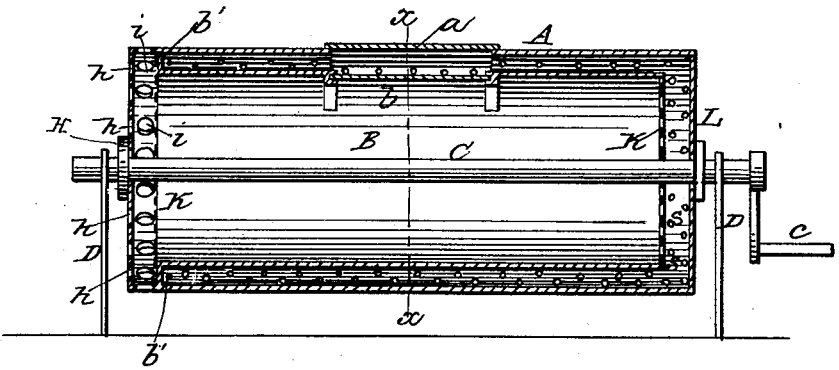

United States Patent Office.

CHARLES G. BAYLOR, OF QUINCY, MASSACHUSETTS.

Letters Patent No. 101,085, dated March 22, 1870.

VEGETABLE-ROASTER.

The Schedule referred to in these Letters Patent and making part of the same.

*To all whom it may concern:*

Be it known that I, CHARLES G. BAYLOR, of the city of Quincy, county of Norfolk, in the State of Massachusetts, have invented a new and useful Improvement in Sweet-Potato Roasters; and I do hereby declare that the following is a full, clear, and exact description thereof, reference being had to the accompanying drawings making a part of this specification, in which—

Figure 1 is a transverse vertical section in the line $x\ x$ of fig. 2, and

Figure 2 is a longitudinal sectional elevation.

My invention relates to an improved roaster, designed for greater efficiency than has hitherto obtained in the construction of such devices for roasting sweet-potatoes or other vegetables, whereby a cheap and valuable article is obtained for the intended purpose.

It consists of two cylindrical devices, fixedly attached to each other, and located the one within the other, both of which, with the exception of the crank, are stationed within a correspondingly-shaped airtight vessel, and so constructed and operated that heated air is conveyed on the outside of said interior cylinder, and then caused to pass through the interior of the same, and into immediate contact with the potato during the process of their being roasted therein, and at the same time that the cylinders are rotated, and the potato thoroughly shifted and agitated.

A is a cylindrical receptacle, which is rigidly attached to the shaft C, which shaft extends through the same longitudinally, the said shaft having its bearings in the standards D D, and having a crank attached thereto for rotating the cylinders.

The cylinder A is provided with a door, $a$, located immediately above the door $b$ of cylinder B, and also with apertures $s$ in the circumference thereof, designed to admit the ingress of heated atmosphere.

The air is first forced into the annular chamber $b'$, through the small apertures $s$ in the exterior cylinder, thence passes into the inner cylinder through the wire-gauze ends K K', and escapes by the holes $h$ and $i$ of the outer cylinder, these being sufficiently large to offer no impediment to the free egress of the same.

The two cylinders A and B are united laterally at $b'$, in order to create a detached hot-air chamber, and thus force the heated atmosphere into and through the interior cylinder, as before described.

This device is located on a suitable oven, or, preferably, within a metallic oven, with the crank thereof projecting through an aperture provided in the same, said oven or casing having an escape-pipe or flue, which flue can be ventilated by a damper.

Having thus described my invention,

What I claim as new, and desire to secure by Letters Patent, is—

The cylinders A and B, provided, respectively, with the apertures $s\ h\ i$ and wire-gauze ends K K', when arranged with relation to each other, substantially as shown and described, and for the purpose specified.

C. G. BAYLOR.

Witnesses:
J. B. ALEXANDER,
JOHN J. HALSTED.

*Assignor to E. S. Tobey, Richard Soule & Charles Soule of Boston, & Lou D. Baylor of Quincy, Mass.*